W. E. HEXAMER & G. E. STAHL.
ATTACHMENT FOR CHAMPAGNE BOTTLES.
APPLICATION FILED MAR. 22, 1915.
1,200,495.
Patented Oct. 10, 1916.
2 SHEETS—SHEET 2.
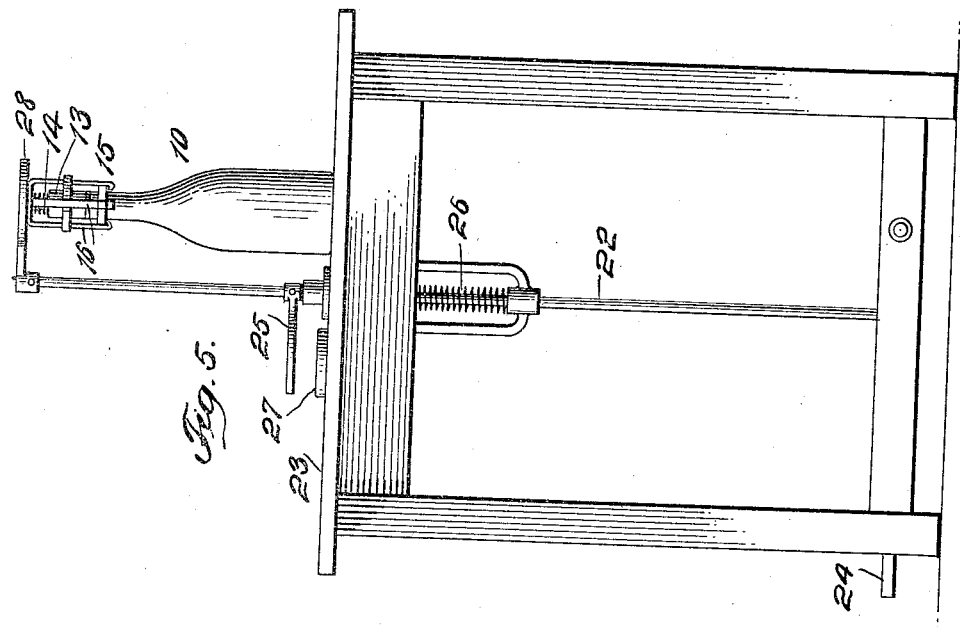
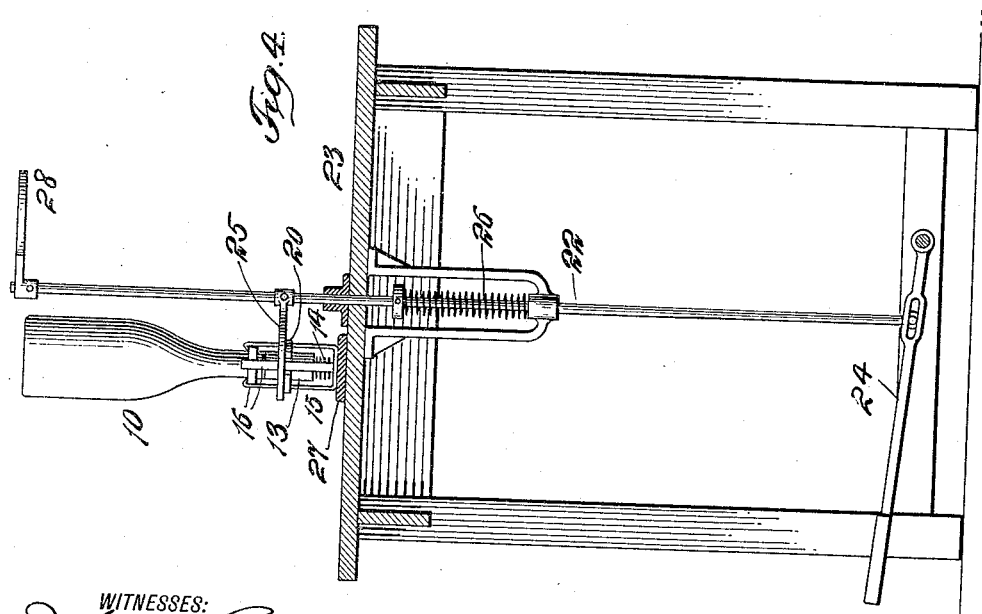
WITNESSES:
INVENTORS:
William Earnest Hexamer
George Emil Stahl
BY
Charles C. Gill,
ATTORNEY.

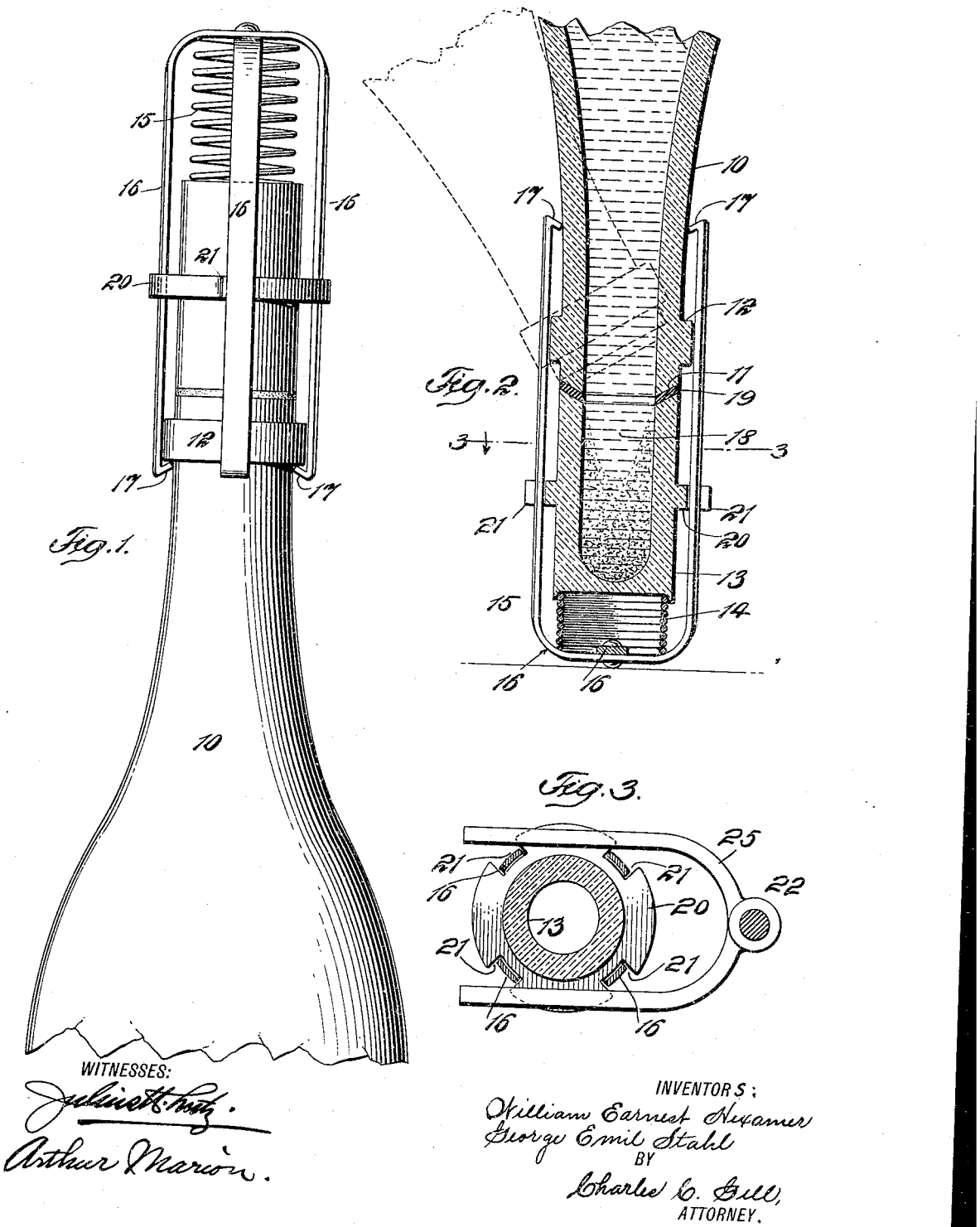

UNITED STATES PATENT OFFICE.

WILLIAM EARNEST HEXAMER, OF PHILADELPHIA, PENNSYLVANIA, AND GEORGE EMIL STAHL, OF JERSEY CITY, NEW JERSEY.

ATTACHMENT FOR CHAMPAGNE-BOTTLES.

1,200,495.

Specification of Letters Patent.

Patented Oct. 10, 1916.

Application filed March 22, 1915. Serial No. 16,032.

*To all whom it may concern:*

Be it known that we, WILLIAM EARNEST HEXAMER, a citizen of the United States, and resident of Philadelphia, in the county of Philadelphia and State of Pennsylvania, and GEORGE EMIL STAHL, a citizen of the United States, and resident of Jersey City, in the county of Hudson and State of New Jersey, have jointly invented certain new and useful Improvements in Attachments for Champagne-Bottles, of which the following is a specification.

The invention relates to improvements in attachments for champagne-bottles and other receptacles, and it consists in the novel features, arrangements and combinations of parts hereinafter described, and particular pointed out in the claims.

Our invention is intended more especially for use on champagne-bottles during the period that the wine is being prepared for the market and in a state of fermentation.

In the manufacture of champagne, a suitably prepared wine is filled into a bottle and the latter is hermetically sealed by means of a cork inserted in the mouth of a bottle and secured by strings to prevent its removal by pressure from within the bottle. The bottle is placed on its side and after fermentation sets in the bottle is gradually, through the course of a considerable period of time, tilted from its horizontal to a perpendicular position with the cork end downward, so that all of the sediment arising during the fermentation may settle in the neck of the bottle and upon the inner end of the cork. When the contents of the bottle are ripe, the attendant carefully takes the bottle from its shelf, cuts the strings at the cork just as carefully, in order not to stir the sediment, and then carefully removes the cork, the bottle during all of this operation being held in its inverted position. As soon as the cork leaves the bottle-neck, the sediment and liquid next to it flow from the bottle, and to prevent as much as it is possible the clear liquid from flowing out, the operator must skilfully and quickly turn the neck of the bottle upward the moment the sediment has been discharged. The attendant then wipes out that portion of the sediment which may still adhere to the inside of the bottle neck, and he then replaces such wine as may have been spilled from the bottle by clear wine, and, after adding the flavor, re-corks the bottle in the usual manner. It is customary for the attendant to use his finger in wiping out the sediment which adheres to the inside of the bottle-neck.

A great deal of loss has ensued from the method above indicated of removing the sediment from the bottle, and the present invention has for its object to provide suitable attachments for use on champagne-bottles during the fermentation period and to reduce to a minimum the loss which is at present occasioned by the existing methods of removing the sediment from the bottles.

In accordance with our invention we dispense with the first cork employed for closing the bottle during the fermentation period and provide the bottle with a cap-attachment containing an adequate interior chamber to receive the sediment from the wine, thus catching all of the sediment in the cap and leaving the neck of the bottle clear of sediment. We also provide novel means for securing the cap and which means enable, at the proper time, the quick separation of the bottle and cap and the restoration of the bottle to its proper upright position, the sediment being left in the cap and with the exercise of reasonable skill very little of the wine being lost from the bottle. We also provide suitable means for aiding the attendant in the separation of the cap and bottle from each other, so that he may quickly turn the bottle to its upright position as soon as the devices securing the cap and bottle together have been released to permit such separation.

The invention will be fully understood from the detailed description hereinafter presented, reference being had to the accompanying drawings, in which:

Figure 1 is a side elevation, partly broken away, of a champagne-bottle equipped with the attachments of our invention, the bottle being shown in its upright position preparatory to being placed on its side in the usual manner for the fermentation period of manufacture; Fig. 2 is a central vertical section of a portion of the same shown inverted, with the sediment in the cap and the securing devices of the cap released to permit of the quick restoration of the bottle proper to its upright position, the movement of the bottle to said position being partly indicated by dotted lines; Fig. 3 is a horizontal section of the same on the dotted lines 3—3 of Fig. 2, and illustrates a portion of the apparatus by which the cap-securing devices are released by foot-pressure; Fig. 4 is a vertical section through a table equipped with means, operable by a foot treadle, for releasing the cap-securing devices, so that the attendant may quickly restore the bottle to its proper position, leaving the cap and its securing devices with the fermentation-sediment in the cap, on the table; Fig. 5 is a like view of the same and indicates a part of the apparatus as in use for initially applying the cap and its securing devices on the bottle.

In the drawings, 10 designates a portion of a champagne bottle of usual character, having a beveled edge or lip 11 surrounding the mouth thereof and formed with an annular exterior encompassing shoulder 12 adjacent to said lip or edge.

The attachment of our invention to be applied to the bottle 10 comprises a cap 13, spring 14 and cage 15, the latter preferably consisting of two U-shaped cross-bars 16 having inwardly and upwardly bent lower ends forming claws 17 to engage beneath the shoulder 12 on the bottle neck, as shown in Fig. 1.

The cap 13 is preferably formed of glass and of elongated form, vertically considered, and said cap contains an interior chamber 18 of adequate capacity to hold the fermentation-sediment, as indicated by the dotting within the cap, in Fig. 2. The cap 13 at its outer end is preferably countersunk to afford a secure seat for the spring 14, and at its inner end said cap has an edge which is beveled correspondingly with the lip 11 around the bottle mouth. In applying the cap 13 to the bottle, a gasket 19 should be inserted between the inner edge of the cap and the lip 11 on the bottle, so that an air-tight joint between the two may be secured. The cap 13 is formed, about midway of its length, with an exterior annular shoulder 20 which is recessed, as at 21, to receive the bars 16 and allow the latter to approach and lie parallel with the sides of said cap.

The spring 14 is confined between the end of the cap 13 and the end of the cage 15 and exerts its tension in a direction to force the cage longitudinally outwardly from the cap and to draw the claws 17 tightly against the lower surface of the shoulder 12 on the bottle neck. In Fig. 1 we illustrate the spring 14 in its somewhat expanded condition drawing the claws 17 against the shoulder 12 on the bottle neck and pressing the cap 13 down on the gasket 19 seated on the lip of the bottle, and when the parts are in the position shown in Fig. 1, the spring 14 is under sufficient tension to closely bind the cap 13 in position and its further expansion is resisted by the cage 15 in its engagement with the bottle. When it is desired to separate the cap 13 and bottle 10, pressure is applied against the outer end of the cage 15 for compressing the spring 14 and moving the claws 17 clear of the shoulder 12, as shown in Fig. 2, whereupon the bottle may be turned upwardly from the cap, the neck of the bottle passing between the bars 16 of the cage in the manner indicated by dotted lines in Fig. 2.

The bars 16 will preferably be of spring metal and have a normal tension toward one another at their free ends, so that they will at all times assuredly maintain a proper relation to the bottle neck.

The attachments of our invention will be applied to the bottles after the wine has been placed therein, and it is desired to permit the fermentation of the same.

After the wine has been placed in a bottle and the attachments of our invention applied thereto, the bottle will be laid on its side, as usual, and from time to time gradually tilted to an upright position with the cap 13 downward, and finally after the fermentation has taken place it will be found that the sediment will be contained in the cap 13 and free of the neck of the bottle. Thereupon it will be the duty of the attendant to separate the cap and bottle, leaving the sediment in the cap and restoring the bottle to its upright position, after which such additional prepared wine and flavor as may be required, will be placed in the bottle and the latter then corked, in the usual way.

The separation of the cap and bottle must be skilfully and quickly performed without stirring up the sediment and without undue loss of wine from the bottle, and to facilitate this operation we provide the apparatus shown in Figs. 4 and 5, which comprise a vertical rod 22 extending through a table 23 and connected at its lower end with a foot treadle 24 and having on its upper portion a fork 25 (Fig. 3), adapted to receive between its arms the cap 13 and cage 15. The rod 22 is guided in its vertical movements and has a tension upwardly under the influence of the coiled spring 26. When it is desired to remove the cap 13 from the bottle, the latter being in its inverted position, the cap 13 will be placed within the fork 25, with the arms of the fork above the shoulder 20 on the cap, and the then lower end of the cage 15 will be seated on a rubber pad 27 located on the table 23 below said fork, and thereupon the attendant while holding the bottle 10 with his hands may press on the foot treadle 24 with his foot and move the rod 22 and fork 25 downwardly, the arms of the fork pressing against the shoulder 20 on the cap and effecting the lowering of the bottle within the cage 15 due to the compression of the spring 14 in the manner shown in Fig. 2. The descent of the bottle and cap together within the cage 15 results in the shoulder 12 on the bottle being carried downwardly from the claws 17 on the ends of the bars of the cage, and thereupon the attendant may while still maintaining his foot on the treadle 24, use both hands in quickly and skilfully reversing the position of the bottle and separating it from the cap and cage then held by the fork 25. The sediment will remain in the cap, and after the bottle has been restored to its upright position, the cap and cage, upon the release of the treadle 24, may be withdrawn from the fork 25.

The operator may reverse the bottle 10 while having either one or both hands on it, but when the mechanism shown in Fig. 4 is made use of for aiding in the separation of the cap and bottle, both hands of the operator are left free to take care of the bottle. After the bottle has been turned to its upright position, the operator may at once add, without having to wipe the inside of the bottle-neck, the flavor and any additional wine that may be required, and then cork the bottle in the usual manner.

Our invention simplifies, expedites and cheapens the method of removing fermentation-sediment from champagne-bottles, and we believe its advantages will be manifest without further detailed explanation.

The mechanism shown in Figs. 4 and 5 may also be utilized for aiding in the initial application of the cap 13 and cage 15 to the bottle, and in order that said apparatus may thus be made use of, we provide the rod 22 on its upper end with a plate 28 adapted to be brought down upon the upper end of the cage 15 in the manner shown in Fig. 5. In the application of the cap and cage to the bottle, the cap then in the cage and pressed toward the lower end thereof, will be applied upon the gasket 19 and the whole placed under the plate 28, the operator holding the cap, cage and bottle in vertical line, and thereupon the attendant by pressing on the foot treadle 24 may cause the plate 28 to press downwardly on the upper end of the cage and drive the prongs of the cage downwardly until the claws 17 pass below and engage the shoulder 12, after which the pressure on the foot treadle may be relieved, since the tension of the spring 14 will effectually bind the cap and cage on the bottle. The bottle may thereupon be placed on its side, as usual, for the fermentation period.

Our invention is intended for use in connection with champagne-bottles and the art of manufacturing champagne, but it may be found to be useful in the removal of sediment from some other liquids.

What we claim as our invention and desire to secure by Letters Patent, is:

1. In combination with a champagne-bottle having an external shoulder about its mouth, a cap applied to the mouth of said bottle having an elongated chamber in line with the bore of the neck of the bottle and adequate to receive the fermentation-sediment, a sealing medium between the cap and bottle-mouth, a spring engaging the end of said cap, and a cage of spring bars inclosing said spring and cap and having claws at the ends of said bars to engage said shoulder, for detachably securing the cap and bottle together and permitting the ready separation of the same while the bottle is inverted; substantially as set forth.

2. In combination with a champagne bottle having an external shoulder about its mouth, an elongated cap applied to the mouth of said bottle and forming a substantially uniform extension of the neck of the bottle and having a chamber adequate to receive the fermentation-sediment to be removed from the wine, a sealing medium between the cap and bottle-mouth, and means for detachably securing the cap and bottle together comprising a spring seated on the outer end of the cap and a cage placed over the spring and cap and having claws at its inner end to engage the shoulder on the bottle when the spring is compressed to permit said claws to reach said shoulder; substantially as set forth.

3. In combination with a champagne bottle having an external shoulder about its mouth, an elongated cap applied to the mouth of said bottle having a chamber adequate to receive the sediment which it may be desired to remove therefrom, a sealing medium between the cap and bottle-mouth, and means for detachably securing the cap and bottle together comprising a spring seated on the outer end of the cap and a cage of spring bars placed over the spring and cap and having inturned ends to engage the shoulder on the bottle when the spring is sufficiently compressed for that purpose, the outer end of the cap being recessed to form a seat for the spring; substantially as set forth.

4. In combination with a bottle or other receptacle having an external shoulder about its mouth an elongated cap applied to the mouth of said bottle having a chamber adequate to receive the sediment which it may be desired to remove therefrom, a sealing medium between the cap and bottle-mouth, and means for detachably securing the cap and bottle together comprising a spring seated on the outer end of the cap and a cage placed over the spring and cap and having claws at its inner end to engage the shoulder on the bottle when the spring is compressed to permit said claws to reach said shoulder, said cap having an external shoulder to enable the cap and bottle to be moved downwardly to free the shoulder on the bottle from said claws when it is desired to separate the bottle and cap; substantially as set forth.

5. In combination with a bottle or other receptacle having an external shoulder about its mouth, an elongated cap applied to the mouth of said bottle having a chamber adequate to receive the sediment which it may be desired to remove therefrom, a sealing medium between the cap and bottle-mouth, and means for detachably securing the cap and bottle together comprising a spring seated on the outer end of the cap and bars placed over the spring and cap and having inturned ends to engage the shoulder on the bottle when the spring is sufficiently compressed for that purpose, said cap having an external shoulder recessed to receive said bars and adapted to afford a bearing for means to press the cap downwardly to compress said spring, thereby permitting the lowering of the bottle to free its shoulder from the said inturned ends of said bars preparatory to the turning of the bottle to its upright position; substantially as set forth.

Signed at New York city, in the county and State of New York, this 11th day of March, 1915.

WILLIAM EARNEST HEXAMER.
GEORGE EMIL STAHL.

Witnesses:
E. C. Duff,
Charles Knight.

Copies of this patent may be obtained for five cents each, by addressing the "Commissioner of Patents, Washington, D. C."